United States Patent
Beroul

(10) Patent No.: US 8,123,483 B2
(45) Date of Patent: Feb. 28, 2012

(54) TO ROTORCRAFT ROTORS FITTED WITH INTER-BLADE DAMPERS

(75) Inventor: Frédéric Beroul, Aix en Provence (FR)

(73) Assignee: Eurocopter, Marignane Cedex (FR)

(*) Notice: Subject to any disclaimer, the term of this patent is extended or adjusted under 35 U.S.C. 154(b) by 1095 days.

(21) Appl. No.: 11/965,786

(22) Filed: Dec. 28, 2007

(65) Prior Publication Data
US 2008/0159862 A1   Jul. 3, 2008

(30) Foreign Application Priority Data
Dec. 28, 2006   (FR) ...................................... 06 11488

(51) Int. Cl.
*B64C 27/51* (2006.01)
(52) U.S. Cl. .......................... 416/140; 416/141; 416/500
(58) Field of Classification Search .................. 416/131, 416/134 A, 140, 141, 500
See application file for complete search history.

(56) References Cited

U.S. PATENT DOCUMENTS
4,915,585 A   4/1990   Guimbal
5,951,251 A   9/1999   Mondet et al.

FOREIGN PATENT DOCUMENTS
FR   948 640   8/1949
FR   2 630 703   11/1989
FR   2 750 948   1/1998

OTHER PUBLICATIONS
French Search Report, Jul. 17, 2007.

*Primary Examiner* — Ninh H Nguyen
(74) *Attorney, Agent, or Firm* — Brooks Kushman P.C.

(57) ABSTRACT

The present invention relates to an improvement to rotorcraft rotors (1) fitted with inter-blade drag dampers (15) such that for each blade (4), the two joints (16) connecting said blade (4) to two inter-blade drag dampers (15) are disposed on either side of the pitch variation axis (101) of said blade, at least one of the two joints (16) being offset to above the plane P containing the pitch variation axis (101) and the vertical flapping axis (102).

9 Claims, 5 Drawing Sheets

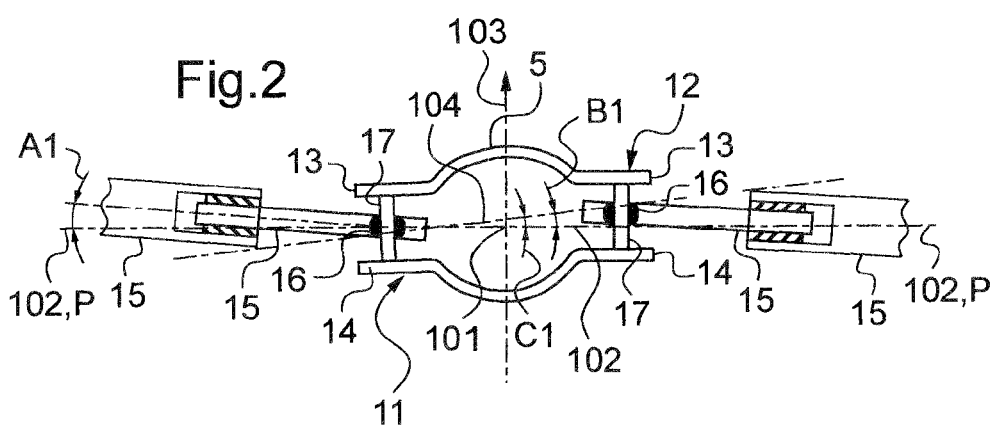
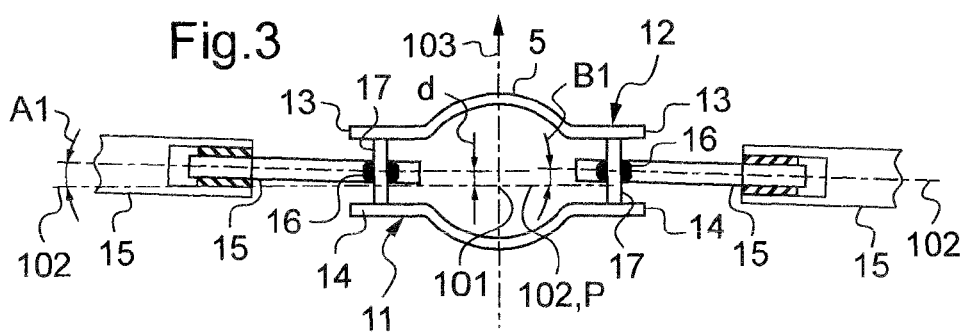
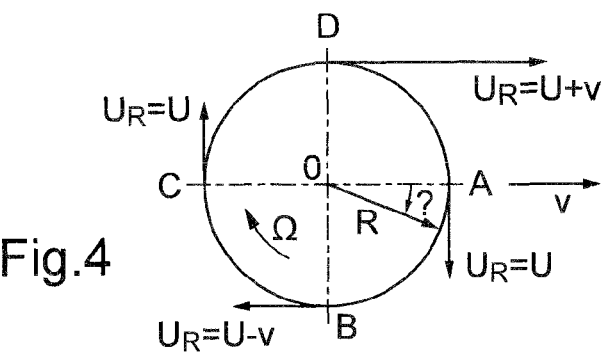
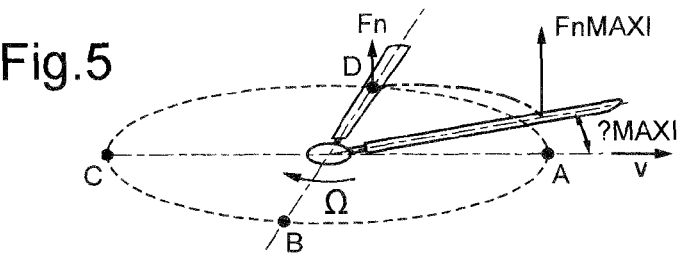

TO ROTORCRAFT ROTORS FITTED WITH INTER-BLADE DAMPERS

The present invention relates to an improvement to rotorcraft rotors fitted with inter-blade dampers.

The technical field of the invention is that of manufacturing helicopters in particular.

BACKGROUND OF THE INVENTION

The invention relates to rotorcraft rotors comprising a hub driven in rotation about an axis of rotation by a drive shaft or outlet shaft from a power transmission gearbox, and also having at least three blades fixed to the hub via appropriate hinges, in particular via respective laminated spherical abutments dedicated to each of the blades, with inter-blade dampers interconnecting each pair of two adjacent blades.

On the assumption that each blade is inserted in a hub in fixed manner, the resulting rotor would be a rigid rotor. When hovering, the distribution of aerodynamic forces along a blade leads to a bending moment distribution presenting a value that is very large at the root of the blade. While flying in translation, the so-called "retreating" blade carries a greater load than the so-called "receding" blade because of the different air speeds of the blades, as described in greater detail below.

Consequently, the resultant of the aerodynamic forces exerted on a blade does not have the same value at each azimuth position, nor does it have the same point of application: the fixed-end moment at the blade root is thus high and varying, leading to alternating stresses that give rise to a fatigue phenomenon that is harmful to materials. In addition, the resultant of the aerodynamic forces on all of the blades is no longer directed along the axis of the rotor, thereby creating a roll moment that increases with increasing speed and that can make it difficult to balance forces when flying in translation.

In order to remedy those drawbacks, it is known to hinge blades on the hub about an axis, that is perpendicular to the drive shaft and that is designated "vertical flapping axis", corresponding to an hinge for vertical flapping that can take up arbitrary orientation forces but that can under no circumstances take up a moment. Consequently, if the blade is hinged to the hub, the moment at its point of attachment is zero. In order to enable a blade to be in equilibrium, the centrifugal forces holding up the blade after it has risen a certain amount, causing conicity $a_0$ to appear.

Under such conditions, there is no longer any large roll moment when flying in translation, and furthermore the blades no longer rotate in a plane, but their outer tips describe a widely-open cone. In practice, the flapping axis is then located not on the axis of rotation but is offset therefrom by a distance a, known as its eccentricity.

In order to support a helicopter in its various configurations, it should also be recalled that it is necessary to be able to control the lift provided by the rotor and to cause it to vary. That is why a pitch hinge is provided, of axis that is substantially parallel to the span of the corresponding blade. This further degree of freedom serves to control the lift of the blade by acting on a general pitch control, and also to cause pitch to vary cyclically, thus enabling the plane of rotation of the blades to be controlled so that they then describe a cone having a virtual axis that no longer coincides with the drive axis: the resultant of the forces applied to the hub changes in direction together with the plane of the rotor. This leads to moments being generated about the center of gravity of the helicopter, thus enabling it to be piloted.

As mentioned above, the plane of rotation of the blades may be different from the plane perpendicular to the drive shaft. Under such conditions, it is necessary in particular for each blade to be hinged in drag since the end of each blade is at a distance from the rotor shaft that varies, as explained more precisely below with reference to Coriolis forces. Otherwise, inertial forces would necessarily appear, generating reciprocating bending moments in each blade in its own plane. Such a drag hinge is provided by hinging a blade about a drag axis that is substantially parallel to the rotor axis, and consequently substantially perpendicular to drag forces. To enable such a blade to be driven by the drive shaft, it is naturally essential for the drag hinge to be far enough away from the rotor axis for the moment due to centrifugal forces to balance the moment due to drag and inertial forces, which means that the drag axis must be offset for eccentric by an amount e, and for this to be achieved without the so-called "drag" angle $\delta$ being too great.

Consequently, the blades of a hinged rotor of a rotary wing aircraft, in particular of a helicopter, can perform the following four kinds of rotary motion:

i) rotation about the rotor axis;

ii) pivoting about a vertical flapping, axis made possible by the hinge for vertical flapping;

iii) pivoting about the drag axis, also referred to as the horizontal flapping axis, made possible by the horizontal movement hinge also known as the drag hinge; and iv) pivoting about the blade axis made possible by a pitch hinge (not specific to hinged rotors).

As described in patent FR 2 497 173, for example, three of the above kinds of rotary motion II, III, and IV can be made possible by using a single member such as a laminated spherical abutment, like that used in SUPER PUMA MKII or NH90 helicopters made by the Applicant, in which such a member allows the blade to move in flapping, in drag, and in pitch.

Nevertheless, the oscillations of each blade about its drag axis can become coupled in unstable manner with the movements or the elastic deformation modes of the fuselage, in particular the oscillations of a helicopter standing on the ground on its landing gear: this is at the origin of the phenomenon known as "ground resonance" that can be dangerous for the aircraft when the natural frequency of the oscillations of the blades about their drag axis is close to one of the natural frequencies of the oscillations of the aircraft on its landing gear.

Remedies for that phenomenon consist in introducing damping on the drag axes, in particular by means of a viscous or dry damper device, or indeed by introducing stiffness with the help of blade spacing cables optionally associated with dampers, as in the ALOUETTE helicopter made by the Applicant.

A function analogous to that of the blade spacing cables is provided by resilient inter-blade connections. In practice, that is done by placing a damper between each pair of two adjacent blades, with the fastenings of such a damper to each of two adjacent blades being at equal distances from the rotor center, i.e. at identical radii relative to the rotor center.

Such dampers include resilient return means of determined stiffness and damping for combating resonant phenomena, in particular ground resonance and also resonance in the drive system that can also appear, in particular on board helicopters.

When rotor blades are excited in drag, the blades move away from their equilibrium position and can be distributed unequally in the circumferential direction, thereby creating an unbalance due to the center of gravity of the rotor being displaced away from its axis of rotation. In addition, blades that are moved away from their equilibrium position oscillate about said position with a frequency $\omega_\delta$, which is the natural frequency of the blades in drag, also referred to as the first drag mode, or the resonant drag mode.

If $\Omega$ is the frequency of rotation of the rotor, it is known that the fuselage of the helicopter is thus excited at the frequencies $|\Omega \pm \omega_\delta|$.

When standing on the ground via its undercarriage, the fuselage of a helicopter constitutes a system comprising a mass suspended above the ground by a spring and a damper in each undercarriage. The fuselage resting on its landing gear thus has its own natural modes of vibration in roll and in pitch. There is a risk of instability on the ground when the frequency at which the fuselage on its undercarriage is excited is close to the natural oscillation frequency $|\Omega + \omega_\delta|$ or $|\Omega - \omega_\delta|$, which corresponds to the phenomenon known as ground resonance. To avoid instability, it is known to seek firstly to avoid passing through these frequencies, and if that cannot be avoided, it is necessary to damp the fuselage on its undercarriage sufficiently and also to damp the blades of the main rotor in terms of their drag motion.

Consequently, the stiffness of the drag dampers of the blades of a main rotor needs to be selected so that the natural frequency of the blades in drag lies outside a potential ground resonance zone, while simultaneously having sufficient damping since, while the speed of rotation of the rotor is passing through a critical speed, both as its speed rises and also as its speed falls, the blades need to be damped sufficiently to avoid entering into resonance.

That is why drag dampers with resilient return means of determined stiffness are also known as frequency adapters.

In general, the stiffness of the damper introduces equivalent angular stiffness opposing the angular movements of the blade relative to the hub about its drag axis. The frequency of the resonant mode of the blades in drag can thus be increased so as to keep that frequency away from the two above-mentioned resonance phenomena.

The equivalent angular stiffness is proportional to the square of the lever arm between the damper and the drag axis of the blade, i.e. the distance between the drag axis and the axis passing through the centers of two ball joints of the damper.

Compared with a conventional configuration in which the dampers are interposed between each blade and the rotor hub, configuring dampers in an inter-blade position serves to increase the lever arm between the dampers and the drag axes of the blades, and also serves to cause two dampers to act on each blade in order to avoid ground resonance. The stiffness of each damper can be limited accordingly, and a resulting advantage is a lower level of static force introduced by fitting each damper as an inter-blade adapter. This configuration is thus very favorable for combating ground resonance.

The invention relates in particular to improving rotorcraft rotors as described in patents FR 2 630 703 and U.S. Pat. No. 4,915,585 relating to a rotor head comprising firstly blades connected to the drive hub by hinges suitable for vertical flapping, for drag, and for pitch, in particular laminated spherical abutments as mentioned above, and also resilient return inter-blade ties with incorporated damping, in compliance with the above description.

Those documents describe a rotor in which each blade is fastened to the hub by a sleeve whose ends form yokes each having two mutually-facing and spaced-apart lugs. Each inter-blade damper is fastened to two adjacent blades via two respective ball joints. Each sleeve is fastened to the rotor hub via a laminated spherical abutment and receives two fastener ball joints for two dampers, respectively. These ball joints are centered on the pitch axis of the blade or they are situated in the immediate vicinity of said pitch axis, and they are also fastened between the two branches of the sleeve, outside the center of the pitch, flapping, and drag hinge compared with the hub, corresponding to a laminated spherical abutment.

According to those patents, it is proposed to offset the two ball joints fastened to a sleeve radially along the pitch axis, and where appropriate to offset them laterally on either side of said axis, with these offsets being as small as possible. The two ball joints are centered substantially in the plane of rotation of the rotor.

Such a disposition for the point where the drag dampers are fastened to the sleeve holding the blades to the hub is for the purpose of completely decoupling phase-shifted angular drag movements from pitch and flapping angular movements.

The present invention has the same object.

In practice, it has been found that the disposition of the two ball joints fastening the drag damper as close as possible to each other and to the pitch-changing axis of the blade leads to structures that are complex and that produce results that are disappointing in terms of decoupling pitch, drag, and flapping oscillations.

OBJECTS AND SUMMARY OF THE INVENTION

An object of the invention is to remedy, at least in part, the shortcomings and drawbacks of known rotorcraft rotor heads having drag dampers interconnecting pairs of successive blades.

Thus, the invention applies to a rotorcraft rotor comprising a hub driven in rotation about an axis of rotation, at least three blades fastened to the hub, each via flapping, drag, and pitch hinges, in particular constituted by a laminated spherical abutment, each blade presenting a pitch variation axis, a leading edge, and a trailing edge, the rotor further including inter-blade drag dampers, each connected to two adjacent blades respectively via at least two spherical joints (or ball joints). When using a laminated spherical abutment, the axis for vertical flapping, the drag axis, and the pitch axis coincide by definition in the center of said abutment.

In accordance with the invention, for each blade, the two joints connecting the blade in question respectively to two ("adjacent") inter-blade dampers are disposed on either side of the pitch variation axis of the blade, at least one of the two joints being offset above the plane P containing the pitch variation axis and the vertical flapping axis of said blade, i.e. in the positive direction of an orthogonal axis to the plane P, the positive direction along said axis being oriented upwards relative to the rotorcraft.

According to preferred characteristics of the invention:
preferably, the two joints connecting the blade to two inter-blade drag dampers are also offset along the orthogonal axis to said plane P;
that one of the two joints connecting the blade to two inter-blade drag dampers that is disposed beside the leading edge of the blade is lower relative to the positive orientation of the axis orthogonal to said plane P than the joint disposed beside the trailing edge of the blade;
the angle formed between the plane P and the axis interconnecting the two centers of the joints fastening an inter-blade drag damper to two adjacent blades is situated in the range about one degree to about seven degrees;
the angle formed between the plane P and the virtual axis interconnecting the two centers of respective fastener joints of two inter-blade drag dampers adjacent to the blade lies in the range about seven degrees to about twenty-two degrees;

the virtual axis interconnecting the two centers of the respective fastener joints of two inter-blade drag dampers adjacent to a blade, is offset in elevation relative to the pitch variation axis of the blade; and the two joints respectively connecting the blade in question to two adjacent inter-blade drag dampers are disposed on an intermediate sleeve having on its radially-outer side a fitting for retaining the blade and on its radially-inner side a yoke fitted with hinges for hinging the assembly comprising the blade and the sleeve to the hub.

As a result, the invention makes it possible to reduce considerably the level of inter-blade oscillation at the frequency of rotor rotation, thus making it possible to increase the lifetime of the inter-blade damper and its damping performance.

BRIEF DESCRIPTION OF THE DRAWINGS

Other characteristics and advantages of the invention appear from the following description which refers to the accompanying drawings and which illustrates, with no limiting character, preferred embodiments of the invention.

FIG. 2 is a diagrammatic cross-section view of a sleeve connecting a blade to a support rotor hub of a helicopter, the view being on II-II of FIG. 1, showing the joint between a first inter-blade drag damper beside the leading edge of a blade, lower down than the joint of a second inter-blade drag damper beside the trailing edge of the same blade.

FIG. 3 shows a variant embodiment differing from FIG. 2, in which the joints of two adjacent inter-blade dampers are offset above the plane containing the pitch variation and vertical flapping axes.

FIG. 4 shows the variations in the relative speed of a blade relative to the air as a function of its azimuth position.

FIG. 5 shows the vertical flapping movement of a blade as a function of its azimuth position.

Elements shown in more than one figure are given the same references in all of them.

MORE DETAILED DESCRIPTION

Figure 1:
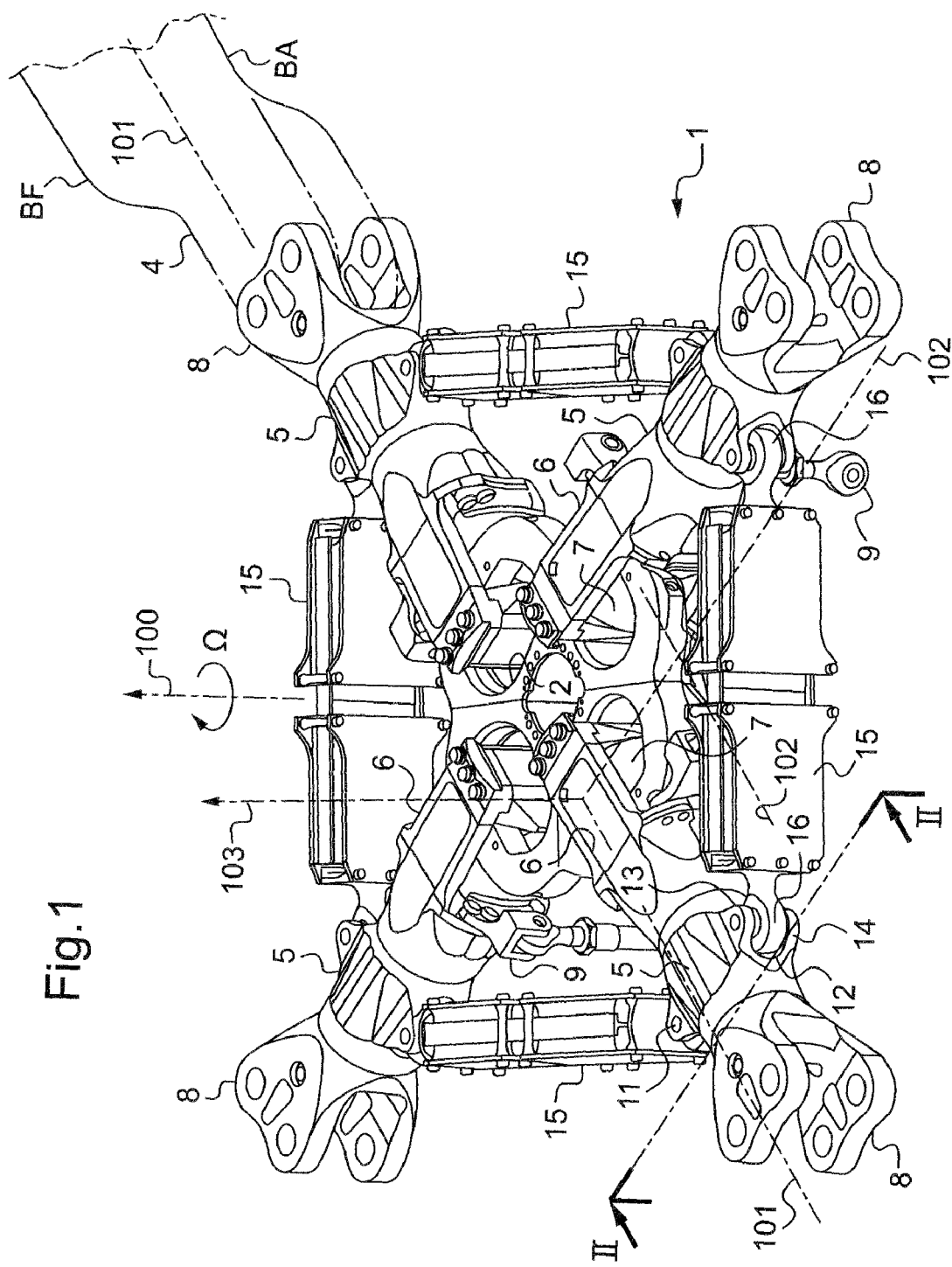
FIG. 1 is a diagrammatic perspective view of a helicopter rotor head of the invention.

FIG. 1 shows a portion of a four-blade rotor head 1 of a rotorcraft having a rigid hub 2 constrained to rotate with a rotor mast (not shown) about an axis of rotation 100, with the speed of rotation of the hub 2 being referenced Ω.

The rotor mast is secured to a main power transmission gearbox (MGB) and transmits lift from the rotor to the structure of the rotorcraft and supports the blades 4 that transform the mechanical energy from the engines into aerodynamic forces.

Thus, the hub 2 serves as an attachment point for each of the blades 4 via a respective sleeve 5 having an inner radial yoke 6 fitted with a laminated spherical joint 7 (or spherical abutment) connecting it to the hub 2, and with an outer radial yoke 8 or fitting for retaining the corresponding blade 4.

Under such conditions, each laminated spherical joint 7 allows each corresponding blade 4 to move in vertical flapping about an axis 102 for vertical flapping, in drag, and also in pitch variation about an pitch variation axis 101 of the blade. Pitch variation is implemented by the action of the pitch control 9 causing the corresponding blade 4 to turn about its pitch variation axis 101.

Naturally, the three functions of a spherical abutment could possibly be implemented by separate means, such as pivot shafts, for example.

In the organization of FIG. 1, the pitch control 9 for each blade 4 is situated beside the trailing edge BF of each blade, with the leading edge of each blade being referenced BA.

Still in the organization of FIG. 1, the rotor 1 has resilient return inter-blade ties 15 or inter-blade drag dampers (or indeed frequency adapters), each inter-blade drag damper being connected to two spherical (or ball) joints 16 connected in yokes at each of the ends of a damper.

In particular, these two joints 16 lie on either side of the pitch variation axis 101 of each blade 4, with at least one of these joints 16 being offset above the plane P containing the pitch variation axis 101 and the vertical flapping axes 102, i.e. in the positive direction of the orthogonal axis 103 that is orthogonal to the plane P, where the positive direction along said orthogonal axis 103 extends upwards relative to the rotorcraft.

Advantageously, these joints 16 may also be disposed on each sleeve 15 in the manner shown in FIGS. 2 and 3.

Nevertheless, in a variant, it is possible to place the joints 16 on some other support such as a blade, for example, or indeed on a cuff as described in patents EP 0 448 685 and EP 0 85 129, in particular.

In any event, each joint 16 is taken up, for example, by a fitting in the form of two yoke lugs 13, 14 disposed on a sleeve 5 (or any other support) in such a manner that such a sleeve comprises, relative to the corresponding blade 4, a first fitting 11 situated beside the leading edge BA of said blade, and a second fitting 12 situated beside the trailing edge BF of the same blade.

More precisely, according to the invention and in advantageous manner, the joint 16 (and consequently the fitting 11) situated towards the leading edge BA of a blade 4 is lower down relative to the positive direction along the orthogonal axis 103 than the joint 16 (and consequently the associated fitting 12) situated towards the trailing edge BF of said blade 4.

FIG. 2 is a diagram showing a sleeve 5 in cross-section on the axis II-II of FIG. 1.

The sleeve 5 driving a blade 4 is connected to the left of FIG. 2 to a first inter-blade drag damper 15 via the first fitting 11, situated beside the leading edge of the corresponding blade 4 via a joint 16 whose central axis 17 is held by two yoke lugs 13, 14. The sleeve 5 is also connected on the right of FIG. 2 to a second damper 5 via means similar to those used for fastening the first damper, via a second fitting 12 situated beside the trailing edge of the blade 4 in question.

Nevertheless, it should be observed that the fitting 12 is disposed above the plane P formed by the pitch variation axis 101 and by the vertical flapping axis 102, i.e. in the positive direction along the orthogonal axis 103, upwards relative to the rotorcraft. In this respect, it should be observed that the axis of rotation 100 and the orthogonal axis 103 are parallel when the plane P is orthogonal to the axis of rotation 100 of the hub.

Consequently, the two joints 16 respectively connect the blade 4 in question to two "adjacent" inter-blade drag dampers 15, being disposed on either side of the pitch variation axis 101, the joint 16 situated beside the trailing edge BF of the blade 4 being offset above the plane P containing the pitch variation axis 101 and the vertical flapping axes 102.

In addition, the virtual axis 104 interconnecting the centers of the respective fastening joints 16 of two inter-blade drag dampers 15 adjacent to a blade 4 is offset in elevation relative to the pitch variation axis 101, i.e. positively relative to the axis of rotation 100.

Thus, this virtual axis 104 presents an offset C1 so that it never intersects the pitch variation axis 101.

In particular, the joint 16 relating to the fitting 11 (beside the leading edge BA of the blade 4) is lower than the joint 16 relating to the fitting 12 (beside the trailing edge BF of the blade 4).

Under such conditions, and as explained below, it is found that:
the angle A1 formed by the plane P, containing the vertical flapping axis 102 and the pitch variation axis 101, relative to the axis interconnecting the two centers of the joints 16 fastening an inter-blade drag damper 15 to two adjacent blades 4 lies in a range going from about one degree to about seven degrees; and
the angle B1 formed by the plane P, containing the vertical flapping axis 102 and the pitch variation axis 101, relative to the virtual axis 104 interconnecting the two centers of respective fastener joints 16 for two inter-blade drag dampers 15 adjacent to a blade 4 lies in a range going from about seven degrees to about twenty-two degrees.

In a variant, it is possible to envisage that two joints 16 connecting the blade 4 to two adjacent inter-blade drag dampers 15 may also be offset along an axis parallel to the orthogonal axis 103. This is shown in FIG. 3 where the two joints 16 lie above the plane formed by the pitch variation axis 101 and the vertical flapping axis 102. This also results in the fittings 11 and 12 being offset in the positive direction of the orthogonal axis 103.

It is important to observe that the joints 16 may be installed on any type of sleeve or on any suitable support (cuff, ...).

The development of the invention is the result of theoretical research and of practical experiments associated with considerations relating to the aerodynamic operation of a rotorcraft rotor, the mechanics of the rotor, and the overall technology of the aircraft. These questions are dealt with below as briefly as possible so as to make it possible to understand clearly the advantage of the above-specified solutions.

As shown in FIG. 4, consideration is given to a rotorcraft flying in translation at a speed v and the positions of the blades of the main rotor are defined by their azimuth angles Ψ, generally determined from the rear position, with the speed of rotation of the rotor being written Ω.

Thus, when flying in translation, the tangential speed U of an element of a blade that is situated at a distance R from the center O of the rotor is combined with the speed in translation v. The resulting speed V then has a tangential component $U_R$ that is the speed of the blade relative to the air.

On examining FIG. 4, the following observations apply with U=ΩR:

a blade in a forwardly-aligned position, is such that the speed $U_R$ of a blade element at the point A (of radius R) is given by $U_R$=U;
the speed of a blade element relative to the air at point B is equal to $U_R$=U−v: that is why the blade is said to be "retreating", since its tangential speed is less than v (the blade is retreating relative to the movement in translation);
the speed of a blade element relative to air at point C (rear position) is $U_R$=U; and
the speed of a blade element relative to air at point D is equal to $U_R$=U+v: that is why the blade is said to be "advancing" since its tangential speed is greater than v (the blade is advancing relative to the movement in translation).

The lift $F_n$ of a blade is proportional to the square of its relative speed $U_R$. Consequently, it results that:
at B, where the speed $U_R$ is at a minimum, lift is at a minimum;
from B to D, lift increases and reaches a maximum at D, where the relative speed $U_R$ is likewise at a maximum;
from D to B, lift decreases; and
at C and A, the value of the lift is an average value.

Because of gyroscopic precession effects, a rotor blade responds 90 degrees after a cause tending to modify its lift. Consequently, if the relative speed is at a maximum at D (the cause), the lift (the effect) is not at a maximum at D, but rather at A, 90 degrees after the point of maximum speed.

Since the blade is hinged to allow it to flap, an increase in lift tends to raise the blade relative to the vertical flapping axis. By virtue of the above-mentioned gyroscopic precession effect, at point A of maximum lift $F_{nMAXI}$, there corresponds a maximum tilt-up angle $\beta_{maxi}$ of the blade such that from D to A, the blade follows an upward path, as shown in FIG. 5.

Figure 6:
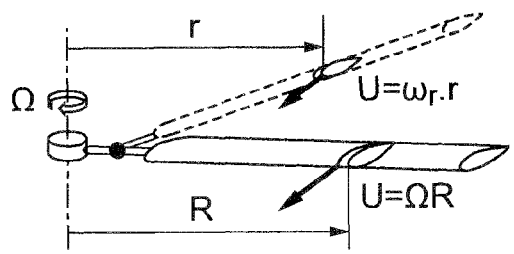
FIG. 6 shows the influence of the vertical flapping of a blade on the tangential speed of a blade element.

Furthermore, and as shown in FIG. 6, when a blade flaps, the circular path followed by an arbitrary element of the blade is modified. Its radius decreases from R to r if the blade rises, and it decreases if the blade goes downwards.

For example, if the blade is rising, the speed U of a blade element equal to ΩR at D becomes $\omega_r$·r, insofar as the blade in question is provided with a drag hinge. The blade element tends to conserve its initial speed U by virtue of inertia during this change in trajectory. Consequently, it can be deduced that the speed $\omega_r$ is greater than Ω: the blade oscillates forwards. The bending moment that would be created in the plane of the blade is eliminated by incorporating the drag hinge.

The blade is subjected to Coriolis forces that cause it to oscillate in the plane orthogonal to the drag axis about a mean position.

Figure 7:
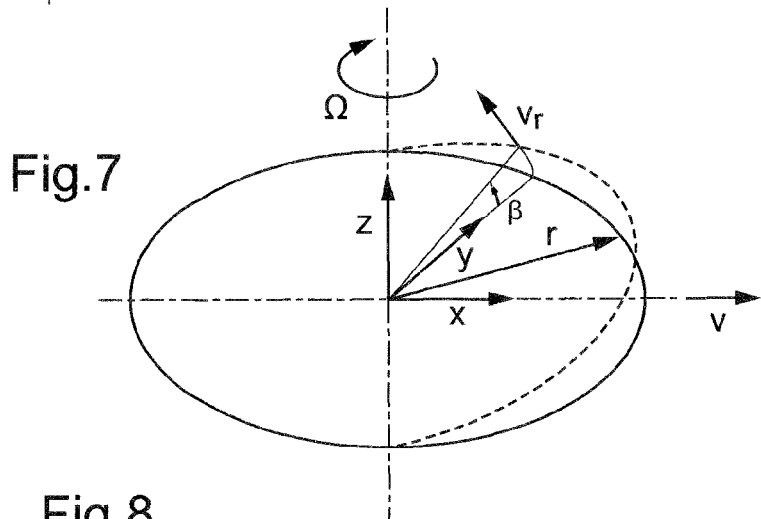
FIG. 7 relates to the effect of Coriolis forces.

The Coriolis forces result from superposing the relative movement due to flapping on the drive movement due to the blades being caused to rotate. As shown in FIG. 7, the speed of rotation Ω characterizes the drive movement applied to a blade, and the speed $v_r$ with which the blade rises corresponds to the relative movement. The Coriolis force applied to a blade element of mass dm is then given by $-2\,dm\,\vec{\Omega}\wedge\vec{v}_r$, i.e. 2·dm·Ω·$v_r$·sin β with:

$$v = r\frac{d\beta}{dt} = r\dot{\beta},$$

and finally 2r·Ω·β·β̇·dm, i.e. directed towards the positive x axis, confirming the previous assertion. There is thus an alternating inertial force $F_i$ due to the vertical flapping of a blade. It should be observed that r corresponds to the distance between the blade element of mass dm and the flapping joint, which in principle is offset relative to the axis of the rotor as shown in the diagram of FIG. 6. The offset of the flapping axis is not shown in FIG. 7 in order to simplify the diagram.

Figure 8:
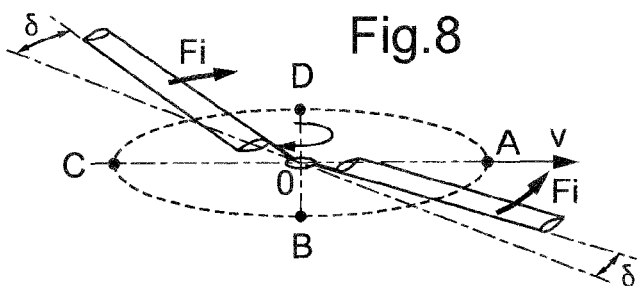
FIG. 8 shows the drag oscillations of a blade as it rotates.

As shown in FIG. 8, the inertial forces $F_i$ vary in direction and in magnitude:

from C to A, the blade rises: the inertial force $F_i$ directed in the direction of rotation causes the blade to oscillate forwards;

from A to C, the blade moves downwards: the inertial force $F_i$ directed in the opposite direction to the direction of rotation causes the blade to oscillate rearwards; and at A and at C, the blade occupies a mean position.

Under these conditions, the results of research carried out by the Applicant and set out below can readily be understood from the above considerations.

Consequently, a theoretical study was carried to in order to reduce the dynamic loads acting on inter-blade drag dampers, where such loads naturally also lead to dynamic forces on the blades and on all of the other elements constituting the rotor of a rotorcraft.

Reducing these loads amounts to diminishing the large amounts of movement imposed on dampers under the effect of the periodic excitation of the rotor. The purpose of seeking to reduce the movements imposed on a damper is to improve damper performance, in particular in terms of lifetime, and consequently to reduce the mechanical stresses on the various elements of a rotorcraft rotor.

Concretely, a study relating to the rotor of a helicopter of the NH90 helicopter class made by the Applicant shows a most advantageous effect of using the same offset for the points of the joints 16 of two inter-blade drag dampers 15 associated with a given blade 4. This offset is written d as shown in FIG. 3 (positive along the positive direction of axis 103), and it is found that the maximum dynamic elongations al take on the following values (d and al expressed in meters) for three configurations.

| Configuration | d | al |
| --- | --- | --- |
| C1 (initial configuration) | 0 | 0.021 |
| C2 | 0.06 | 0.010 |
| C3 | 0.12 | 0.018 |

Figure 9:
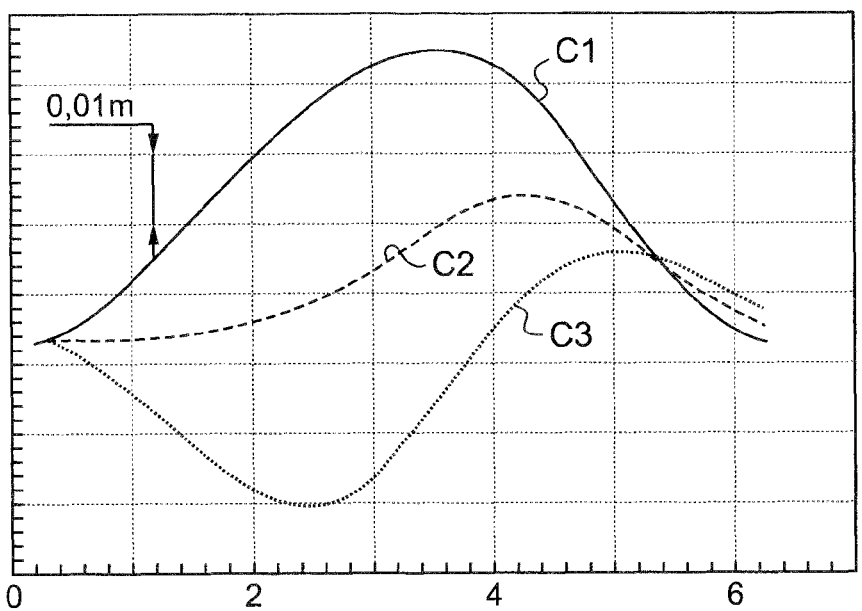
FIG. 9 relates to variations in the elongations of an inter-blade drag damper as a function of the azimuth position of a blade for three configurations, comprising a base configuration C1 and two configurations C2 and C3 with identical offsets for the two hinges of two dampers of a given blade, upwards relative to the rotorcraft.

The variations in overall elongation (static and dynamic) in these three configurations C1, C2, and C3 are shown respectively in FIG. 9 where the abscissa axis corresponds to the azimuth position of the blade in radians, and the ordinate axis corresponds to the overall movements of the damper.

Configuration C2 is the most favorable since it enables dynamic elongations to be reduced by a factor of about 2.

This offset in the positive direction of orthogonal axis 103 is substantially equivalent to additional conicity of about 0.17 radians, i.e. nearly ten degrees, the joints 16 being at 0.345 m from the laminated spherical abutment 7.

Figure 10:
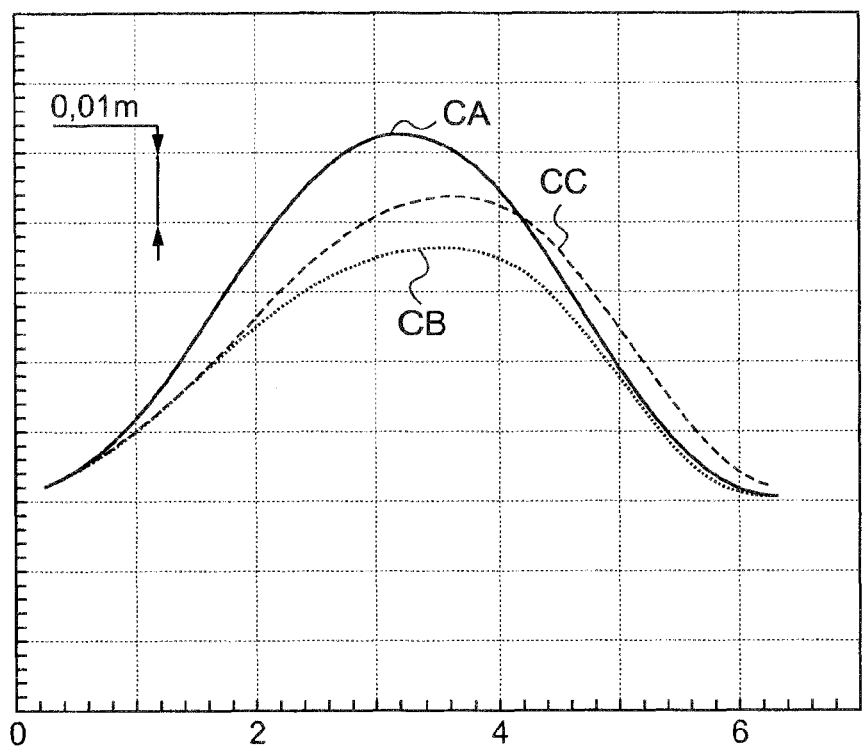
FIG. 10 shows the influence of drag, flapping, and pitch on the C1 configuration of FIG. 9.
Figure 11:
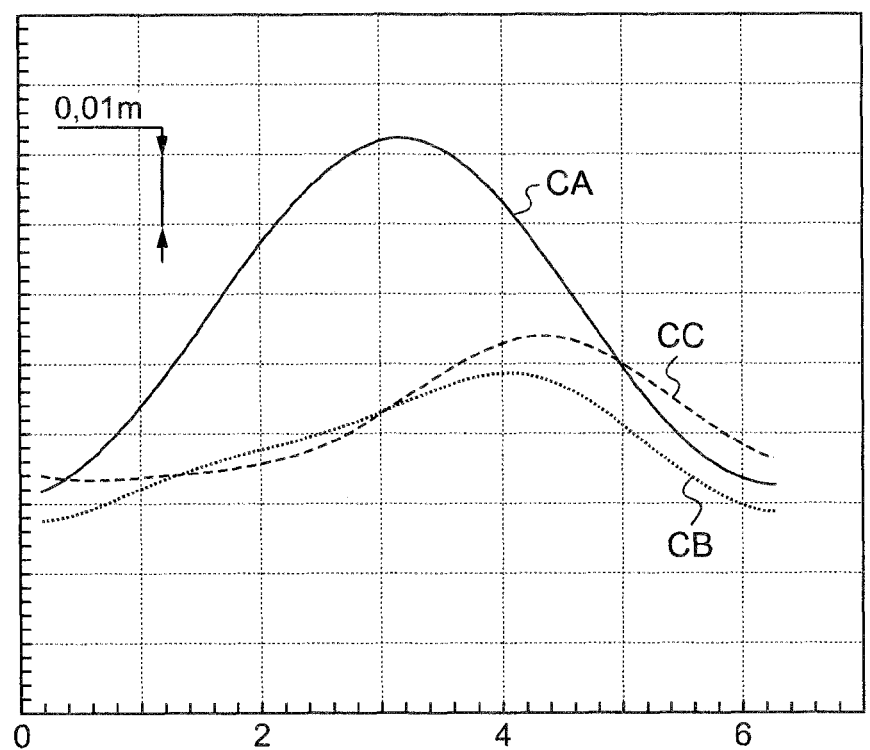
FIG. 11 shows the influence of drag, flapping, and pitch on the C2 configuration of FIG. 9.

FIGS. 10 and 11 show the contributions of the various parameters, respectively for the configurations C1 and C2.

Thus, these two figures show the respective contributions CA, CB, and CC relating to the effects of drag alone, of drag and flapping combined, and finally of drag combined with flapping and with pitch.

The abscissa and ordinate axes also correspond respectively to the azimuth position of a blade and to the overall movements of the damper.

It can thus be seen that taking flapping into account reduces the effect of drag alone, because of the action of Coriolis forces.

Finally, it should be observed that an excessive increase in the offset d becomes penalizing insofar as a fraction of the damper forces can be introduced into the pitch control system which could also lead to instability of the "driven stick" type known to the person skilled in the art.

Figure 12:
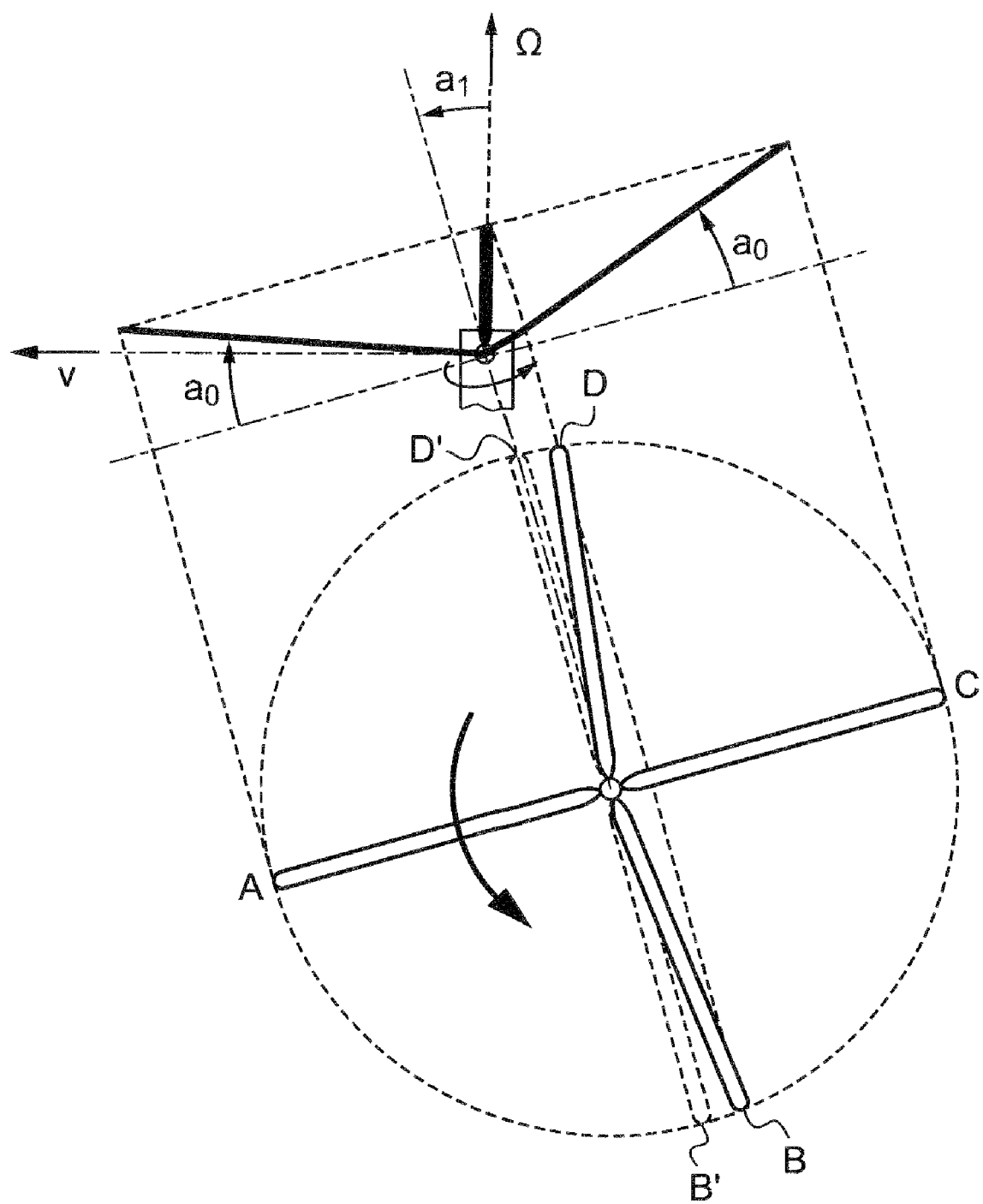
FIG. 12 shows the effects of the cyclic variation in blade pitch on the flapping angle.

As shown in FIG. 12, it is recalled that in forward flight at speed v, the main rotor of a rotorcraft rotates with conicity $a_0$ in a plane other than the drive plane. Consequently, each blade describes a cone of vertical axis making an angle $a_1$ with the drive axis, or hub axis or indeed rotor shaft (normal to the drive plane), corresponding to the support of the rotation vector $\vec{\Omega}$. Under such circumstances, the plane of the rotor as described by the tips of the blade is likewise inclined at the angle $a_1$ relative to the drive plane. By definition, it is further recalled that as a general rule the angle $a_1$ relates to longitudinal tilting of the rotor, whereas lateral tilting is identified by an angle $b_1$.

Furthermore, FIG. 12 shows that the tips of the blades do not rotate in their plane with movement that is uniform, such that in equal periods of time corresponding to one-fourth of a revolution of the rotor shaft, they describe arcs AB, BC, CD, and DA that become increasingly unequal as the quantities $a_0$ and $a_1$ increase. This observation can also be explained by the fact that the blades are at a distance from the rotor shaft that varies.

These effects are due to cyclical pitch variations combined with the general pitch that enable the plane of the rotor to tilt and that enable a rotorcraft to fly forwards.

Naturally, the drag hinges are designed to allow these movements.

More precisely, FIG. 12 shows that a blade in position C corresponds to a maximum flap angle relative to v, whereas a blade in position A relates to a minimum flap angle. A blade thus rises from A towards B and C, after which it descends.

It can also be seen that the length of the arc AB is longer than that of the arc BC (B': midpoint between A and C), so the speed of the blade over the arc BC is less than its speed over the arc AB.

In other words, and because of the effect of the above-mentioned Coriolis forces, a rising blade (flapping vertically) is slowed in its movement so that it tends to describe equal displacements in three dimensions in equal times, thereby tending to maintain its kinetic energy substantially constant and consequently tending to keep the speed of said blade substantially constant by virtue of its inertia. This speed also tends to be constant on the arc CDA.

It is therefore legitimate to consider that the vertical flapping of blades tends to reduce drag displacements and thus to keep the blades equidistant, as is shown by way of consequence by FIGS. 10 and 11 (contribution CB being more favorable than contribution CA).

In other words, it is legitimate to consider that the contribution to the vertical flapping movements can limit the movements of an inter-blade drag damper.

It has been established that offsetting the joints of the drag dampers along the positive direction of the axis 103 is equivalent, in the present embodiment, to additional conicity of about 10°.

In other words, such an offset can be considered as generating vertical flapping of a blade and consequently of reducing the movements of the corresponding inter-blade damper, as can be seen from the results shown in FIG. 11.

Furthermore, a campaign of experiments in flight using a SUPER PUMA MKII helicopter made by the Applicant has shown that a (differential) crossed position of the joints 16 is advantageous for that type of aircraft. The application was carried out using a configuration C4 relating to an offset d of the joint 16 at the trailing edge of the blade of 0.035 m above the plane P, the joint 16 at the leading edge of the same blade being offset by −0.005 m, i.e. downwards relative to the plane P. In other words, the two joints 16 for said blade were indeed offset along the orthogonal axis 103 to the plane P, and the joint 16 beside the trailing edge of the blade is indeed above the plane P. The initial configuration, without offsetting either of the two joints 16 is written C0.

The table below summarizes the results of measurements performed firstly in level flight at speeds of 80 knots (kts), 100 kts, 120 kts, and 140 kts, and secondly while turning with load factors of 1.4 g, 1.8 g, and 2 g, where g is the acceleration due to gravity:

| D (meters) | C0 | C4 |
| --- | --- | --- |
| 80 kts level | 0.018 | 0.011 |
| 100 kts level | 0.021 | 0.0125 |
| 120 kts level | 0.023 | 0.015 |
| 140 kts level | 0.027 | 0.018 |
| Turning at 1.4 g | 0.032 | 0.022 |
| Turning at 1.8 g | 0.038 | 0.029 |
| Turning at 2 g | 0.041 | 0.033 |

It can be seen that a large reduction in the dynamic movements of an inter-blade drag damper can be obtained by differentially offsetting the joints 16 as in the above study.

A large gain of at least 35% is observed both in level flight and when turning, and this is without being affected by variations in the center of the helicopter.

This improvement thus makes it possible to lengthen the lifetime of such a damper by a factor of 3 or 4.

It is also important to observe that similar results can also be obtained with joints 16 such as the joint 16 at the trailing edge at 0.075 m above the plane P (configuration C5), while the joint at the leading edge was at 0.005 m below said plane.

It can be seen that the angle A1 relating to configurations C4 and C5 is equal respectively to ten degrees and to twenty-two degrees. The optimum range for the angle A1 lies substantially between seven and twenty-two degrees, given the specific research also carried out on the EC155 helicopter made by the Applicant. Under such conditions, the above-described values for the angle B1 also occur.

Naturally, the description above as applied to a four-blade rotor is equally applicable to any rotor having at least three blades, i.e. capable of corresponding to a structure making use of resilient return inter-blade ties.

Naturally, the present invention is capable of numerous modifications as to its implementation. Although several variants are described above, it will readily be understood that it is not conceivable to identify exhaustively all possible variants. It is Naturally possible to envisage replacing any of the means described by equivalent means without thereby going beyond the ambit of the present invention.

What is claimed is:

1. A rotorcraft (1) rotor comprising a hub (2) driven in rotation about an axis of rotation (100) oriented positively upwards relative to the rotorcraft, at least three blades (4) fastened to the hub (2) each via vertical flapping, drag, and pitch hinge (7), each blade (4) presenting a pitch variation axis (101), a leading edge (BA), and a trailing edge (BF), the rotor (1) further including inter-blade drag dampers each connected to two adjacent blades (4) respectively via at least two spherical joints (16) or ball joints, the two joints (16) connecting one blade (4) to two adjacent inter-blade drag dampers (15) being disposed on either side of the pitch variation axis (101) of the blade (4), wherein at least one of said joints (16) is offset above the plane P containing the pitch variation axis (101) and the vertical in the positive direction of the orthogonal axis (103) that is orthogonal to the plane P, the positive direction along said orthogonal axis (103) being oriented upwards relative to the rotorcraft.

2. A rotor (1) according to claim 1, wherein the two joints (16) connecting the blade (4) to two inter-blade drag dampers (15) are also offset along the orthogonal axis (103) to said plane P.

3. A rotor (1) according to claim 1, wherein that one of the two joints (16) connecting the blade (4) to two inter-blade drag dampers (15) that is disposed beside the leading edge (BA) of the blade (4) is lower relative to the positive orientation of the orthogonal axis (103) to said plane P than is the joint (16) disposed beside the trailing edge of the blade (4).

4. A rotor according to claim 1, wherein the angle (A1) formed between the plane P and the axis interconnecting the two centers of the joints (16) fastening an inter-blade drag damper (15) to two adjacent blades (4) is situated in the range about one degree to about seven degrees.

5. A rotor (1) according to claim 1, wherein the angle (B1) formed between the plane P and the axis interconnecting the two centers of respective fastener joints (16) of two inter-blade drag dampers (15) adjacent to the blade (4) lies in the range about seven degrees to about twenty-two degrees.

6. A rotor (1) according to claim 1, wherein the two joints (16) respectively connecting the blade (4) in question to two adjacent inter-blade drag dampers (15) are disposed on an intermediate sleeve (5) having on its radially-outer side a fitting (8) for retaining the blade (4) and on its radially-inner side a yoke (6) fitted with hinges (7) for hinging the assembly comprising the blade (4) and the sleeve (5) to the hub.

7. A rotor (1) according to claim 1, including at least three blades (4).

8. A rotor (1) according to claim 1, wherein the hinges (7) enabling a blade (4) to flap vertically, and move in drag and in pitch relative to the hub (2) are implemented by means of a single laminated spherical abutment.

9. A rotor (1) according to claim 1, wherein the virtual axis (104) interconnecting the centers of respective fastener joints (16) of two inter-blade drag dampers (15) adjacent to the blade (4) is offset in elevation relative to the pitch variation axis (101) of the blade.

* * * * *